(12) United States Patent
Abraham et al.

(10) Patent No.: US 9,763,190 B2
(45) Date of Patent: Sep. 12, 2017

(54) METHOD AND APPARATUS FOR GPS ENHANCED NEIGHBOR AWARE NETWORK (NAN) CLUSTER DISCOVERY

(71) Applicant: QUALCOMM Incorporated, San Diego, CA (US)

(72) Inventors: Santosh Paul Abraham, San Diego, CA (US); Alireza Raissinia, Monte Sereno, CA (US); George Cherian, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 14/681,671

(22) Filed: Apr. 8, 2015

(65) Prior Publication Data

US 2015/0296458 A1  Oct. 15, 2015

Related U.S. Application Data

(60) Provisional application No. 61/978,543, filed on Apr. 11, 2014.

(51) Int. Cl.
*H04W 52/02* (2009.01)
*H04W 56/00* (2009.01)

(52) U.S. Cl.
CPC ..... *H04W 52/0225* (2013.01); *H04W 52/028* (2013.01); *H04W 52/0229* (2013.01); *H04W 56/00* (2013.01); *H04W 56/001* (2013.01); *Y02B 60/50* (2013.01)

(58) Field of Classification Search
CPC ......... H04W 4/08; H04W 8/00; H04W 8/005; H04W 52/025; H04W 60/00; H04W 74/0883

See application file for complete search history.

(56) References Cited

U.S. PATENT DOCUMENTS

| 2010/0177708 A1* | 7/2010 | Pandey ............. H04W 74/0883 370/329 |
| 2014/0010089 A1 | 1/2014 | Cai et al. |

(Continued)

FOREIGN PATENT DOCUMENTS

| WO | 2007082036 A1 | 7/2007 |
| WO | 2009009356 A1 | 1/2009 |

(Continued)

OTHER PUBLICATIONS

Partial International Search Report for International Application No. PCT/US2015/025196, ISAEPO, Date of Mailing Feb. 5, 2016, 11 pages.

(Continued)

*Primary Examiner* — Andrew Lai
*Assistant Examiner* — Leon Andrews
(74) *Attorney, Agent, or Firm* — Toler Law Group, PC

(57) ABSTRACT

A method includes transmitting, at an electronic device in a neighbor aware network (NAN), a discovery beacon at a designated discovery beacon transmission time. The designated discovery beacon transmission time is determined based on an internal clock of the electronic device. The method further includes synchronizing the internal clock to a clock reference that is external to the electronic device.

30 Claims, 7 Drawing Sheets

(56) References Cited

U.S. PATENT DOCUMENTS

2015/0282157 A1    10/2015  Kim et al.
2016/0337836 A1*   11/2016  Kim ........................ H04W 4/08

FOREIGN PATENT DOCUMENTS

WO      2013151902 A1    10/2013
WO      2014054910 A1     4/2014

OTHER PUBLICATIONS

Ericsson: "Synchronization Procedures for D2D Discovery and Communication," 3rd Generation Partnership Project Document for Discussion #73, May 20-24, 2013, 3rd Generation Partnership Project, Sophia Antipolis Cedex France, 6 pgs.
Ericsson: "Synchronization Procedures for D2D Discovery and Communication," 3rd Generation Partnership Project Document for Discussion #75, Nov. 11-15, 2013, 3rd Generation Partnership Project, Sophia Antipolis Cedex France, 6 pgs.
Ericsson: "Synchronization Procedures for D2D Discovery and Communication," 3rd Generation Partnership Project Document for Discussion #76, Feb. 10-14, 2014, 3rd Generation Partnership Project, Sophia Antipolis Cedex France, 7 pgs.
International Search Report and Written Opinion for International Application No. PCT/US2015/025196, ISA/EPO, Mailing Date May 27, 2016, 25 pgs.

* cited by examiner

METHOD AND APPARATUS FOR GPS ENHANCED NEIGHBOR AWARE NETWORK (NAN) CLUSTER DISCOVERY

I. CROSS REFERENCE TO RELATED APPLICATIONS

The present application claims priority from U.S. Provisional Patent Application No. 61/978,543, filed Apr. 11, 2014 and entitled "METHOD AND APPARATUS FOR GPS ENHANCED NEIGHBOR AWARENESS NETWORKING (NAN) CLUSTER DISCOVERY," the content of which are incorporated herein in its entirety.

II. FIELD

The present disclosure is generally related to neighbor aware network (NAN) discovery at devices that perform synchronization operations based on a global positioning satellite (GPS) signal.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Electronic devices, such as wireless telephones, may use wireless connections to access networks in order to transmit and receive data. In addition, electronic devices may use wireless connections to exchange information directly with each other. For example, mobile electronic devices that are in close proximity to each other may use a neighbor aware network (NAN) to perform data exchanges via the NAN (e.g., without involving wireless carriers, wireless fidelity (Wi-Fi) access points, and/or the Internet). To join a NAN, a device performs a scan for a "discovery beacon" (e.g., an "anchor" beacon or a "synchronization" beacon) for a time interval designated by a NAN standard. If the device receives a discovery beacon, the device may use the discovery beacon to determine a time of an upcoming "discovery window" during which the device may perform one or more operations to join the NAN. Discovery beacons may be transmitted at any time during the time interval (preceding the "discovery window"). In order to ensure reception of discovery beacons, the device activates a receiver for an entirety of the time interval, thus consuming power during the entirety of the time interval.

IV. SUMMARY

The present disclosure is directed to methods and devices to reduce power consumption related to NAN discovery in NANs. A "master" device of a NAN may schedule transmissions of discovery beacons at designated discovery beacon transmission times during a time interval based on an internal clock of the master device. The designated discovery beacon transmission times may be indicated by timing information stored at multiple devices (e.g., at the master device and at "non-master" devices) of the NAN. Because a non-master device (e.g., a mobile device) stores the timing information, the non-master device may activate a receiver at the designated discovery beacon transmission times based on an internal clock of the non-master device. The non-master device may activate the receiver to scan for and to receive the discovery beacons at the designated discovery beacon transmission times. The non-master device may deactivate the receiver during a remaining portion of the time interval (e.g., at times other than the designated discovery beacon transmission times) to conserve power.

In order to reduce or eliminate a possibility that clock drift of the internal clocks causes the receiver of the non-master device to be deactivated when the master device transmits a discovery beacon, the master device and the non-master device may synchronize the internal clocks based on one or more clock references (e.g., a global positioning satellite signal or a paging signal from a base station) that are external to the master device and the non-master devices. By synchronizing the internal clocks, clock drift may be compensated for and the receiver of the non-master device may be activated at the designated discovery beacon transmission times to receive the discovery beacons from the master device. Thus, the non-master device may deactivate the receiver during the remaining portion of the time interval to reduce power consumption as compared to activating the receiver during an entirety of the time interval.

Additionally, electronic devices searching for NANs to join may be configured to transmit probe requests during a portion of a probe request time interval and to deactivate transmitters during a remainder of the probe request time interval to conserve power. The master device may be configured to activate the receiver to scan for (and to receive) probe requests during the portion of the probe request time interval and to deactivate the receiver during the remainder of the probe request time period to conserve power. Additionally, limiting transmission of the probe requests to the portion of the probe request time interval reduces "pollution" in the NAN (e.g., reduces or eliminates interference to other wireless transmissions caused by probe requests during the remainder of the probe request time interval).

In a particular aspect, a method of wireless communication includes transmitting, at an electronic device in a neighbor aware network (NAN), a discovery beacon at a designated discovery beacon transmission time. The designated discovery beacon transmission time is determined based at least in part on an internal clock of the electronic device. The method further includes synchronizing the internal clock to a first clock reference that is external to the electronic device.

In another particular aspect, an apparatus includes a processor and a memory coupled to the processor. The memory stores instructions that are executable by the processor to perform operations including initiating a scan, at an electronic device of a neighbor aware network (NAN), for one or more probe requests at a designated probe request transmission time and during a scan interval. The designated probe request transmission time is determined based at least in part on an internal clock of the electronic device. The operations further include synchronizing the internal clock to a clock reference that is external to the electronic device.

In another particular aspect, an apparatus includes means for initiating transmission, at an electronic device in a neighbor aware network (NAN), of a discovery beacon at a designated discovery beacon transmission time. The designated discovery beacon transmission time is determined based at least in part on an internal clock of the electronic device. The apparatus further includes means for synchronizing the internal clock to a first clock reference that is external to the electronic device.

In another particular aspect, a non-transitory computer readable medium includes instructions that, when executed by a processor, cause the processor to initiate a scan, at an electronic device of a neighbor aware network (NAN), for one or more probe requests at a designated probe request transmission time and during a scan interval. The designated probe request transmission time is determined based at least in part on an internal clock of the electronic device. The instructions may further cause the processor to synchronize the internal clock to a clock reference that is external to the electronic device.

One advantage provided by at least one of the disclosed aspects is a reduction in power consumption related to scanning a NAN for discovery beacons in order to join the NAN. For example, a master device may schedule transmissions of discovery beacons at designated discovery beacon transmission times that are stored at a mobile device. The mobile device may activate a receiver at one or more of the designated discovery beacon transmission times to scan for discovery beacons and may receive the discovery beacons transmitted by the master device. The mobile device may deactivate the receiver at other times (e.g., during a remaining portion of a time interval not associated with the designated discovery beacon transmission times). By synchronizing an internal clock of the mobile device and an internal clock of the master device based on a clock reference, such as a GPS signal or a paging signal from a base station, clock drift associated with the internal clocks may be compensated for. For example, a possibility that the receiver of the mobile device will be deactivated when the master device transmits the discovery beacons may be reduced or eliminated. Thus, the mobile device activates the receiver at the designated discovery beacon transmission times and deactivates the receiver during the remaining portion of the time interval instead of activating the receiver during an entirety of the time interval, thereby reducing power consumption at the mobile device. Additionally, probe request messages may be transmitted during a portion of a probe request time interval that is determined based on the internal clocks. Thus, devices may conserve power by deactivating transmitters and/or receivers during a remainder of the probe request time interval. Additionally, interference to other wireless transmissions in the NAN caused by probe request messages may be reduced by limiting the probe request messages to being transmitted during the portion of the probe request time interval.

Other aspects, advantages, and features of the present disclosure will become apparent after a review of the entire application, including the following sections: Brief Description of the Drawings, Detailed Description, and the Claims.

V. BRIEF DESCRIPTION OF THE DRAWINGS

VI. DETAILED DESCRIPTION

Particular aspects of the present disclosure are described below with reference to the drawings. In the description, common features are designated by common reference numbers throughout the drawings.

Figure 1:
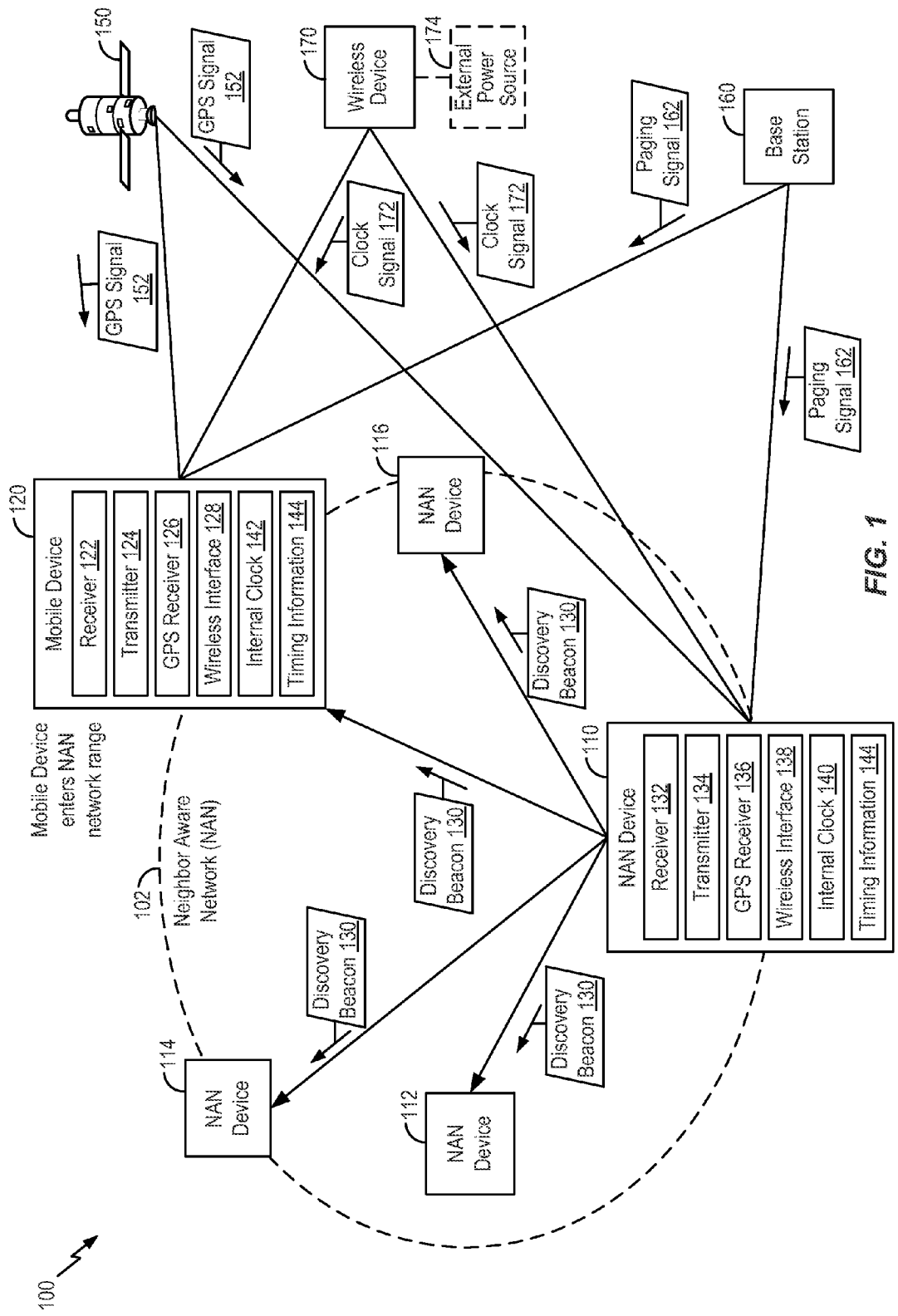
FIG. 1 is a diagram of a particular aspect of a system that includes a neighbor aware network (NAN) that supports transmission of a beacon at a designated discovery beacon transmission time.

Referring to FIG. 1, a particular aspect of a system 100 that includes a neighbor aware network (NAN) 102 that supports transmission of a beacon (e.g., discovery beacon 130) at a designated discovery beacon transmission time is shown. One or more electronic devices may be part of the NAN 102. In FIG. 1, the NAN 102 includes NAN devices 110, 112, 114, and 116 (e.g., electronic devices that have joined the NAN 102). The NAN 102 is illustrated for convenience only and is not limiting. For example, in other aspects, the NAN 102 may include any number of electronic devices at any locations in the NAN 102. The NAN devices 110-116 may be fixed electronic devices or mobile electronic devices. For example, the NAN devices 110-116 may include or correspond to stations, access points, mobile phones, laptop computers, tablet computers, multimedia devices, peripheral devices, data storage devices, or a combination thereof. Additionally or alternatively, the NAN devices 110-116 may include a processor (e.g., a central processing unit (CPU), a digital signal processor (DSP), a network processing unit (NPU), etc.), a memory (e.g., a random access memory (RAM), a read-only memory (ROM), etc.), and/or a wireless interface configured to send and receive data via the NAN 102, as described further with reference to FIG. 9.

The NAN devices 110-116 may exchange data and/or services via the NAN 102. For example, the NAN devices 110-116 may form a group of electronic devices (e.g., stations) configured to perform wireless communications via one or more wireless channels. The group of electronic devices may form a peer-to-peer wireless network. In some implementations, the group of electronic devices may include or correspond to a data path group (e.g., a group of electronic devices that share a particular service and/or that share one or more security or authentication features). A data path group may also be referred to as a NAN data path. In other implementations, the group of electronic devices may include or correspond to a different infrastructure-less, ad-hoc wireless network. The group of electronic devices may also include or correspond to a wireless fidelity ("wi-fi") network. In a particular implementation, the group of electronic devices may include or correspond to a social wireless mesh network (a "social wi-fi mesh").

As used herein, the NAN 102 may support operations in accordance with wireless protocols and/or standards, such as an Institute of Electrical and Electronics Engineers (IEEE) 802.11 standard. For example, the NAN devices 110-116 may operate in accordance with an IEEE 802.11a, b, g, n, ac, or ad standard. As another example, the NAN devices 110-116 may operate in accordance with a Wi-Fi Alliance standard or one or more other NAN standards. In alternate implementations, the NAN devices 110-116 may operate in accordance with a different wireless protocol or standard. Additionally, one or more of the NAN devices 110-116 may be configured to communicate with a cellular network via one or more cellular communication protocols and/or standards, such as a code division multiple access (CDMA) protocol, an orthogonal frequency division multiplexing (OFDM) protocol, an orthogonal frequency division multiple access (OFDMA) protocol, a time division multiple access (TDMA) protocol, a space division multiple access (SDMA) protocol, or a combination thereof.

FIG. 1 also illustrates a mobile device 120 that has entered a coverage area (e.g., a "range") of the NAN 102. On or more mobile (e.g., non-fixed) devices may enter and exit the NAN 102 at various times during operation. In a particular implementation, the mobile device 120 may be configured to perform one or more operations to join the NAN 102, as further described herein. As further described with reference to FIG. 9, the mobile device 120 and the NAN devices 110-116 may include at least one wireless receiver (e.g., receivers 122 and 132) and at least one wireless transmitter (e.g., transmitters 124 and 134) configured to communicate wirelessly among the NAN devices 110-116 and the mobile device 120. Although certain operations described herein may be described with reference to a "receiver" or a "transmitter," in other implementations a transceiver may perform both data receiving and data transmitting operations.

One or more of the NAN devices 110-116 and the mobile device 120 may include an internal clock for use in determining when to perform one or more data transmission or data reception operations, as further described herein. For example, a first NAN device 110 may include a first internal clock 140 and the mobile device 120 may include a second internal clock 142. In a particular implementation, the internal clocks 140 and 142 may be "low-power" system clocks associated with a "clock drift" of 20 parts-per-million (ppm). A system clock with a 20 ppm clock drift may introduce 20 microseconds (μs) of clock error during each second of operation. Additionally, one or more of the NAN devices 110-116 and the mobile device 120 may be configured to receive one or more global positioning satellite (GPS) signal(s), to communicate via one or more cellular network(s), and/or to communicate via one or more other wireless network(s). For example, the first NAN device 110 and the mobile device 120 may include GPS receivers 126 and 136, respectively, that are communicatively coupled to a GPS satellite 150. As another example, the first NAN device 110 and the mobile device 120 may be communicatively coupled via wireless interfaces 128 and 138, respectively to a base station 160 of a cellular network. As another example, the first NAN device 110 and the mobile device 120 may be communicatively coupled via the wireless interfaces 128 and 138, respectively, to a wireless device 170 of another wireless network. In a particular implementation illustrated in FIG. 1, the first NAN device 110 and the mobile device 120 are configured to transmit and/or receive discovery beacons at designated discovery times, as further described herein, and the NAN devices 112-116 (which are not communicatively coupled to the GPS satellite 150, the base station 160, the wireless device 170, or a combination thereof) are not configured to transmit and/or receive the discovery beacons at the designated discovery beacon transmission times. In other implementations, any number of the NAN devices 112-116 may include an internal clock, may be communicatively coupled to the GPS satellite 150, the base station 160, the wireless device 170, or a combination thereof, and may be configured to transmit and/or receive the discovery beacons at the designated discovery beacon transmission times. In another particular implementation, NAN devices that are configured to transmit and/or receive the discovery beacons at the designated discovery beacon transmission times are associated with a particular device manufacturer, and devices associated with other device manufactures are not configured to transmit and/or receive the discovery beacons at the designated discovery beacon transmission times.

During operation, the mobile device 120 may perform NAN discovery to determine whether a NAN (e.g., the NAN 102) is available. A NAN protocol of the NAN 102 may provide for a periodic broadcast of an "anchor beacon" (e.g., a "discovery beacon" transmitted prior to an upcoming "discovery window"). For example, the anchor beacon may be transmitted at least once during a first time interval according to the NAN protocol. As described by at least one NAN standard, the first time interval has a duration of approximately 200 milliseconds (ms). The anchor beacon (and other discovery beacons) may enable NAN-enabled devices (e.g., the NAN devices 110-116 and the mobile device 120) to detect a presence of the NAN 102. The anchor beacon may notify newly arriving mobile devices (e.g., the mobile device 120) when a next NAN discovery window will occur. During the NAN discovery window, the NAN-enabled devices (e.g., the NAN devices 110-116 and the mobile device 120) may perform discovery operations, including but not limited to identifying other devices in the NAN 102, identifying services provided by devices in the NAN 102, transferring data to other devices in the NAN 102, and/or scheduling a future data transfer (e.g., a data transfer subsequent to the conclusion of the discovery window). Performing the discovery actions enables the NAN-enabled devices to join the NAN 102.

Anchor beacons may be transmitted by an "anchor master" device of the NAN 102 or other "master" device(s) of the NAN 102. In a NAN, a master device may be responsible for transmitting the anchor beacon (e.g., a "synchronization beacon") at the start of each NAN discovery window. The synchronization beacon may be used by other (e.g., non-master) devices in the NAN to synchronize to a clock signal of the anchor master device. In some implementations, the master device may also be responsible for scheduling discovery windows. In a particular implementation, discovery windows may be 16 ms in duration and may occur after every anchor beacon. In other implementations, discovery windows may have a different duration and/or may occur at different times. If a master device of a NAN leaves the NAN, another device may become the master device. In a particular implementation, to balance power consumption among devices, the role of master device may periodically be transferred to a different NAN device.

In accordance with the NAN protocol, a conventional non-master device in the NAN activates a receiver for an entirety of the first time interval (e.g., the approximately 200 ms during which a discovery beacon may be transmitted, as described by at least one NAN standard) in order to receive any potential anchor beacons. However, activating a receiver for the entirety of the first time interval causes significant power consumption at the non-master devices. In contrast, non-master devices of the present disclosure reduce power consumption by activating receivers at designated discovery beacon transmission times during the first time interval instead of for the entirety of the first time interval. In a particular implementation, a non-master device may enter a "powered-on" mode and activate the receiver at the designated discovery beacon transmission times for a scan interval having a duration of approximately 4 ms. In addition, the receiver may be activated for a power-up interval having a duration of approximately 1.58 ms and for a power-down interval having a duration of approximately 0.13 ms. In other implementations, the scan interval, the power-up interval, and the power-down interval may have different durations. Additionally or alternatively, the duration of the scan interval and the number of designated transmission times may be selected based on a target discovery beacon transmission probability or a target power consumption at the non-master device.

Accordingly, multiple devices (e.g., the first NAN device 110 and the mobile device 120) may store timing information 144 associated with one or more designated discovery beacon transmission times. In a particular implementation, the first NAN device 110 may act as a master device and may transmit a discovery beacon 130 to the NAN devices 112-116 and to the mobile device 120 at a designated discovery beacon transmission time determined based at least in part on the first internal clock 140. The designated discovery beacon transmission time may be indicated by the timing information 144 stored at least at the first NAN device 110 and the mobile device 120. For example, the timing information 144 may include a time offset at which discovery beacons are to be transmitted during the first time interval (e.g., the 200 ms time interval). In a particular implementation, a first discovery beacon may be transmitted at a first occurrence of the time offset during the first time interval, and additional discovery beacons may be transmitted at multiples of the time offset during the first time interval. As an example, discovery beacons are transmitted approximately every 20 ms (e.g., at 20 ms, at 40 ms, at 60 ms, etc.) during the 200 ms time interval for an illustrative time offset of 20 ms.

In a particular implementation, the mobile device 120 may act as a non-master device and may perform a scan for discovery beacons for a duration of a scan window (e.g., a scan period) at the designated discovery beacon transmission time, or designated discovery beacon transmission times. For example, the mobile device 120 may activate the receiver 122 at the designated discovery beacon transmission time to perform the scan, thus receiving the discovery beacon 130. In a particular implementation, the mobile device 120 may be in a low power mode (e.g., a "sleep" mode) prior to activating the receiver 122, and the mobile device 120 may enter a "powered-on" mode to activate the receiver 122. In a particular implementation, the mobile device 120 may activate the receiver 122 at least by the designated discovery beacon transmission time. In another implementation, the mobile device 120 may activate the receiver 122 to perform the scan prior to the designated discovery beacon transmission time, such that the designated discovery beacon transmission time occurs during the duration of the scan window. The duration of the scan window may be preprogrammed in the mobile device 120 during manufacture of the mobile device 120, and the duration may be selected to compensate for clock drifts of the internal clocks 140 and 142. As an example, the duration of the scan window may be approximately 4 ms.

Although a single beacon transmission at a designated discovery beacon transmission time has been described, such description is not limiting. For example, the timing information 144 may indicate multiple designated discovery beacon transmission times during the first time interval. When multiple designated discovery beacon transmission times are indicated, the mobile device 120 may activate the receiver 122 for a corresponding scan window at each of the designated discovery beacon transmission times. Additionally, in other implementations, one or more of the NAN devices 112-116 may include an internal clock and may activate a receiver at the designated discovery beacon transmission times in a similar manner as the mobile device 120. Additionally or alternatively, some of the NAN devices 112-116 may be configured to activate receivers for an entirety of the first time interval. For example, some of the NAN devices 112-116 may be devices that do not store the designated discovery beacon transmission times, such as legacy devices or devices associated with other device manufacturers.

During a remaining portion of the first time interval (e.g., at times not associated with one or more scan windows), the mobile device 120 may deactivate the receiver 122. In a particular implementation, the mobile device 120 may enter the low power (e.g., sleep) mode when the receiver 122 is deactivated. Deactivating the receiver 122 and/or entering the low power (e.g., sleep) mode during the remaining portion of the first time interval reduces power consumption as compared to activating the receiver 122 for an entirety of the first time interval. The mobile device 120 may enter the powered-on mode and may activate the receiver 122 to perform one or more discovery operations during the discovery window. For example, the mobile device 120 may activate the receiver 122 prior to a start of the discovery window or during the discovery window. To illustrate, the discovery beacon 130 may indicate and the receiver 122 may be activated at a time prior to a start time of the discovery window. Alternatively, the mobile device 120 may activate the receiver 122 after the start time of the discovery window, as indicated by the discovery beacon 130. The start time of the discovery window is subsequent to the designated discovery beacon transmission times. The one or more discovery operations may enable the mobile device 120 to join the NAN 102.

In order to operate in accordance with the NAN 102, the receiver 122 of the mobile device 120 may be configured in a first operation mode. In the first operation mode, the receiver 122 is activated at the designated discovery beacon transmission times and deactivated at other times. At one or more times during operation, the mobile device 120 may join other NANs having master devices that do not transmit discovery beacons at the designated discovery beacon transmission times. In order to operate with the other NANs, the mobile device 120 configures the receiver 122 in a second operating mode. The second operating mode causes the receiver 122 to be activated for an entirety of the first time interval. The mode of operation may be determined based on a scan for discovery beacons at the designated discovery beacon transmission times. For example, the mobile device 120 may determine whether any discovery beacons have been received at the designated discovery beacon transmission times. In a particular implementation, the mobile device 120 may scan for discovery beacons at the designated discovery beacon transmission times during a first time interval (e.g., a 200 ms time interval) to determine whether any discovery beacons have been received. In another implementation, the mobile device 120 may scan for discovery beacons at the designated discovery beacon transmission times during multiple time intervals to determine whether any discovery beacons have been received. A number of designated discovery beacon transmission times may be indicated by the timing information 144, which may be stored (e.g., pre-programmed) in the mobile device 120 during production. In response to determining that no discovery beacons have been received at the designated discovery beacon transmission times, the mobile device 120 may configure the receiver 122 in the second operating mode so that the receiver 122 is activated for an entirety of a time interval (e.g., approximately 200 ms). Thus, if the mobile device 120 does not detect any discovery beacons at the designated discovery beacon transmission times, the mobile device 120 may switch the receiver 122 to the second operating mode.

In a particular implementation, the internal clocks 140 and 142 may be synchronized based on a first clock reference that is external to the first NAN device 110 and the mobile device 120 to maintain synchronization between the first internal clock 140 and the second internal clock 142. In a particular implementation, the first clock reference may include or correspond to a GPS signal 152 received from the GPS satellite 150. The first NAN device 110 and the mobile device 120 may activate the GPS receivers 126, 136 to acquire (e.g., receive) the GPS signal 152 from the GPS satellite 150. For example, the first NAN device 110 may activate the GPS receiver 136 for a particular duration at a first frequency to acquire the GPS signal 152 to receive the GPS signal 152 at the first NAN device 110. For example, the GPS receiver 136 may be activated approximately once every six minutes for the particular duration of approximately one second. The mobile device 120 may similarly activate the GPS receiver 126 approximately once every six minutes for the particular duration (e.g., approximately one second) to receive the GPS signal 152 at the mobile device 120.

After acquiring (e.g., receiving) the GPS signal 152, the first NAN device 110 and the mobile device 120 may synchronize the internal clocks 140 and 142 based on the GPS signal 152. Synchronizing the internal clocks 140 and 142 based on the GPS signal 152 may reduce or eliminate a possibility that the receiver of the mobile device 120 may be deactivated when the first NAN device 110 transmits the discovery beacon 130 at the designated discovery beacon transmission times. For example, clock drift associated with the internal clocks 140 and 142 may cause the timing of the internal clocks 140 and 142 to diverge. If the timing diverges to a sufficient amount, the designated discovery beacon transmission time determined based on the first internal clock 140 may be outside a scan window determined using the second internal clock 142, thus causing the mobile device 120 to fail to receive the discovery beacon 130. However, synchronizing the internal clocks 140 and 142 based on the clock reference (e.g., the GPS signal 152) may compensate for the clock drift by periodically eliminating divergence between the internal clocks 140 and 142 before the divergence causes the receiver of the mobile device 120 to be deactivated during a discovery beacon transmission. Accordingly, a possibility that the mobile device 120 will not receive the discovery beacon 130 at the designated discovery beacon transmission time is reduced or eliminated.

In other implementations, the first clock reference that is external to the first NAN device 110 and the mobile device 120 may be a different signal than the GPS signal 152. For example, the first clock reference may be a paging signal 162 received from the base station 160. The first NAN device 110 and the mobile device 120 may synchronize the internal clocks 140 and 142 based on the paging signal 162. As another example, the first clock reference may be a clock signal 172 received from the wireless device 170. In some implementations, the wireless device 170 may be coupled to an external power source 174 (instead of a battery) and may have a clock that is more accurate (e.g., is associated with less clock drift) than the internal clocks 140 and 142. In a particular implementation, the wireless device 170 may be an access point (AP) in an IEEE 802.11 wireless network (e.g., a Wi-Fi network), and the first NAN device 110 and the mobile device 120 may receive the clock signal 172 from the wireless device 170 via the wireless interfaces 138 and 128, respectively. Alternatively, the wireless device 170 may be a station (STA) in a Wi-Fi network, and the first NAN device 110 and the mobile device 120 may receive the clock signal 172 from the wireless device 170 via the wireless interfaces 138 and 128, respectively. Alternatively, the wireless device 170 may be a device acting as a group owner (GO) in accordance with a Wi-Fi Direct transmission protocol or standard, and the wireless device 170 may transmit the clock signal 172 to the first NAN device 110 and to the mobile device 120 via a WiFi-Direct transmission or other peer-to-peer (P2P) transmission. After receiving the clock signal 172, the first NAN device 110 and the mobile device 120 may synchronize the internal clocks 140 and 142 based on the clock signal 172.

In another particular implementation, the internal clocks 140 and 142 may be synchronized based on multiple clock references that are external to the first NAN device 110 and to the mobile device 120. For example, the first NAN device 110 and the mobile device 120 may perform first synchronization operations (e.g., "coarse tuning") on the internal clocks 140 and 142 based on a first clock reference. The first NAN device 110 and the mobile device 120 may also perform second synchronization operations (e.g., "fine tuning") on the internal clocks 140 and 142 based on a second clock reference. The first clock reference may include or correspond to the GPS signal 152. For example, the first NAN device 110 and the mobile device 120 may activate the GPS receivers 136, 126 for a particular duration (e.g., approximately one second) at a second frequency to acquire the GPS signal 152. The second synchronization operations may be performed based on the paging signal 162 received via a paging channel associated with communication between the base station 160 and the devices (e.g., the first NAN device 110 and the mobile device 120) or via a broadcast channel associated with communication between the base station 160 and the devices. In a particular implementation, the base station 160 may be configured to operate in accordance with a long term evolution (LTE) wireless standard and the paging signal 162 may be received via the paging channel at a rate of approximately once per five seconds. In other implementations, the first NAN device 110 and the mobile device 120 may be communicatively coupled to different base stations and may perform the second synchronization operations based on different paging signals.

Performing the first synchronization operations (e.g., the course tuning) and the second synchronization operations (e.g., the fine tuning) on the internal clocks 140 and 142 may maintain synchronization between the first internal clock 140 and the second internal clock 142 using fewer first synchronization operations as compared to performing the first synchronization operations without performing the second synchronization operations. In a particular implementation, a frequency of activation (e.g., the second frequency) of the GPS receivers 136, 126 may be approximately once per hour if the second synchronization operations are performed as compared to a frequency of activation of approximately once per six minutes (e.g., the first frequency) if the second synchronization operations are not performed. Because activating the GPS receivers 136, 126 may consume more power than communicating with the base station 160, reducing a frequency of activating the GPS receivers 136, 126 reduces power consumption at the first NAN device 110 and the mobile device 120.

In addition, in implementations where the first NAN device 110 and the mobile device 120 are communicatively coupled to different base stations, performing the first synchronization operations based on the GPS signal 152 may compensate for differences between base station clocks (and corresponding paging signals) of the different base stations. For example, if the first NAN device 110 and the mobile device 120 are communicatively coupled to different base stations associated with different service providers, the corresponding base station clocks and paging signals may not be precisely synchronized. However, differences in the corresponding paging signals may be compensated for through the performance of the first synchronization operations based on the GPS signal 152 (e.g., a global synchronization signal).

In another particular implementation, the first NAN device 110 may act as a non-master device in the NAN 102. In this implementation, a master device of the NAN 102 may not transmit a discovery beacon at the designated discovery beacon transmission times. The first NAN device 110 may scan the NAN 102 for one or more discovery beacons at the designated discovery beacon transmission times based on the timing information 144. The first NAN device 110 may transmit the discovery beacon 130 to the NAN devices 112-116 and to the mobile device 120 in response to determining that no discovery beacons have been received at the designated discovery beacon transmission times. For example, the first NAN device 110 may transmit the discovery beacon 130 during scan windows beginning at, or encompassing, the designated discovery beacon transmission times.

If the first NAN device 110 determines that at least one discovery beacon has been received at the designated discovery beacon transmission times, the first NAN device 110 may suppress transmission of the discovery beacon 130 to reduce power consumption. The first NAN device 110 may deactivate the receiver 132 during a remaining portion of the first time interval (e.g., at times other than the designated discovery beacon transmission times). By transmitting the discovery beacon 130 at the designated discovery beacon transmission times, even when not acting as a master device, the first NAN device 110 may enable other devices (e.g., the mobile device 120) in the NAN 102 to receive the discovery beacon 130 during a scan window at the designated discovery beacon transmission times and to conserve power by deactivating receivers during the remaining portion of the first time interval.

The system 100 may thus support various aspects of NAN discovery in which non-master devices may deactivate receivers for portions of a time interval. Instead of activating a receiver for an entirety of the time interval (e.g., approximately 200 ms), a non-master device may activate the receiver for scan windows at designated discovery beacon transmission times stored at the non-master device. Because a master device schedules transmission of discovery beacons at the designated discovery beacon transmission times, the non-master device may deactivate the receiver for a remaining portion of the time interval (e.g., times not associated with the scan windows), thereby reducing power consumption as compared to activating the receiver for an entirety of the time interval. Additionally, the master device and the non-master device may synchronize internal clocks based on at least one clock reference (e.g., a GPS signal or a paging signal from a base station) to reduce or eliminate a possibility that clock drift will cause the receiver of the non-master device to be deactivated when the master device transmits the discovery beacons.

It should be noted that although one or more aspects are described herein with reference to a device (e.g., the mobile device 120) entering a NAN, the described NAN discovery techniques may also be used by devices that are already part of a NAN. For example, a device in a first NAN may receive a discovery beacon associated with a second overlapping NAN at a designated discovery beacon transmission time. The device may activate a receiver at the designated discovery beacon transmission time to receive the discovery beacon from the second NAN and may deactivate the receiver at other times to conserve power. The device may join the second NAN and conduct NAN discovery based on the received discovery beacon. In a particular aspect, a device may be part of multiple NANs at the same time and/or may merge/bridge multiple NANs together into a larger NAN.

Figure 2:
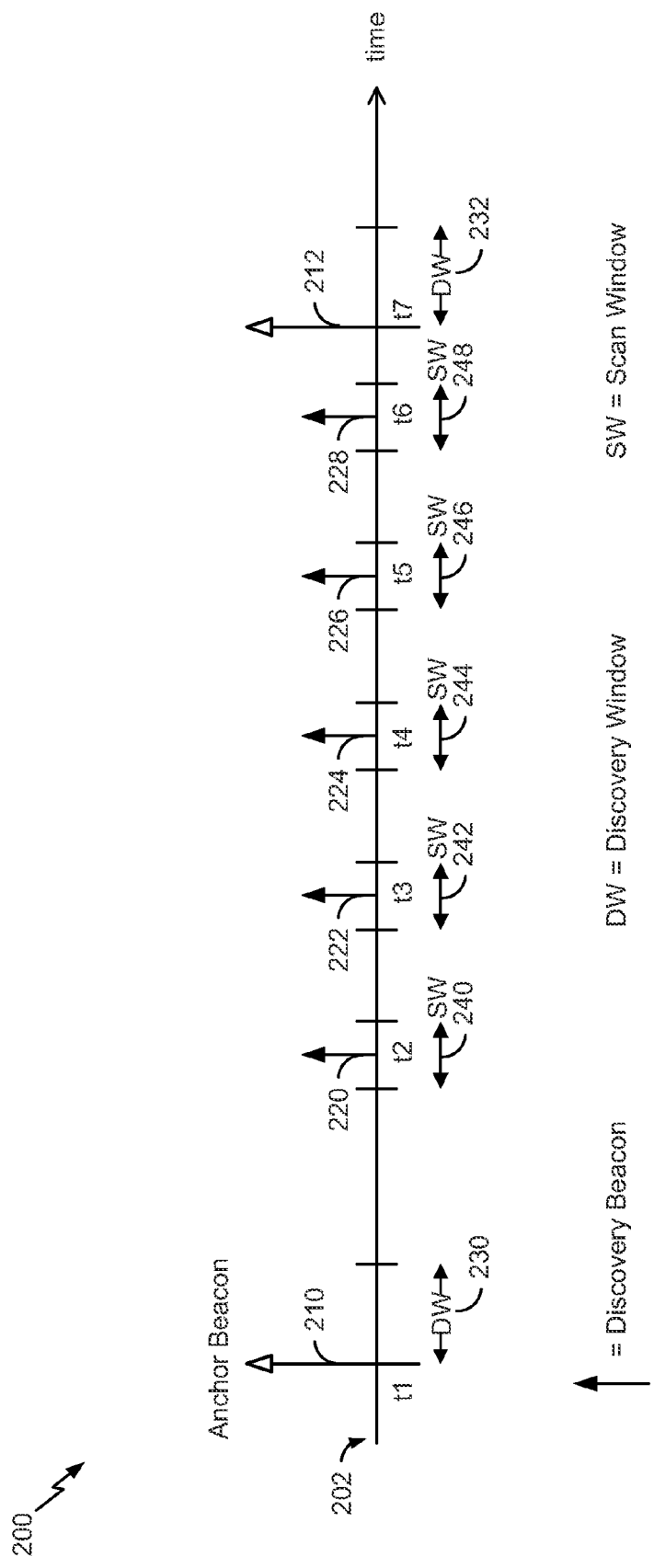
FIG. 2 is a diagram illustrating operation at the system of FIG. 1.

FIG. 2 illustrates operation at the system 100 and is generally designated 200. In FIG. 2, NAN operation in a NAN is illustrated along a horizontal axis 202 representing time.

As shown in FIG. 2, NAN device(s) (e.g., a master device) may periodically transmit anchor beacons 210 and 212 at times t1 and t7, respectively, based on an internal clock of the master device. The anchor beacons 210 and 212 may enable synchronization of non-master device internal clocks with the internal clock of the master device prior to an upcoming discovery window (DW) 230 and 232, respectively. The master device (e.g., the first NAN device 110 of FIG. 1) may also transmit one of more discovery beacons 220-228 at designated discovery beacon transmission times t2-t6 based on the internal clock of the master device. The designated discovery beacon transmission times t2-t6 may be "known" (e.g., stored) at multiple NAN devices in the NAN. The discovery beacons 220-228 may indicate a start time of a next discovery window (e.g., discovery window 232).

When a mobile device (e.g., the mobile device 120 of FIG. 1) arrives in a NAN coverage area prior to time t1, the mobile device may enter a powered-on mode and activate a receiver for a duration of a scan window at one or more of the designated discovery beacon transmission times t2-t6 to scan for discovery beacons. For example, the mobile device may activate the receiver for the duration of one or more of the scan windows 240-248 based on an internal clock of the mobile device to perform the scan. The scan windows 240-248 may be scheduled to include the designated discovery beacon transmission times t2-t6. For example, a first scan window 240 may begin prior to the designated discovery beacon transmission time t2 and may conclude subsequent to the designated discovery beacon transmission time t2. When the receiver is activated during one or more of the scan windows 240-248, the mobile device may receive one or more of the discovery beacons 220-228. The mobile device may determine the start time of the upcoming discovery window (e.g., discovery window 232) based on one of more of the discovery beacons 220-228 and may perform NAN discovery operations during the upcoming discovery window.

Additionally, the mobile device may enter the low power (e.g., sleep) mode and deactivate the receiver for a remaining portion of a time interval (e.g., time t1 to t7) that is not associated with the scan windows 240-248 to conserve power as compared to activating the receiver for an entirety of the time interval. In other systems, clock drift associated with the internal clock of the mobile device or the internal clock of the master device may cause the internal clocks to diverge such that the master device transmits the discovery beacons 220-228 at times when the receiver of the mobile device is deactivated. To reduce or eliminate a possibility that the receiver of the mobile device is deactivated when the master device transmits the discovery beacons 220-228 (e.g., during the designated discovery beacon transmission times t2-t6), the master device and the mobile device may perform one or more synchronization operations based on one or more clock references (e.g., a GPS signal and a paging signal from a base station), as explained with reference to FIG. 1. Thus, the operations in FIG. 2 enable mobile stations to conserve power by activating receivers at the designated discovery beacon transmission times and deactivating the receiver (e.g., entering the low power mode) for remaining portions of corresponding time intervals.

Figure 3:
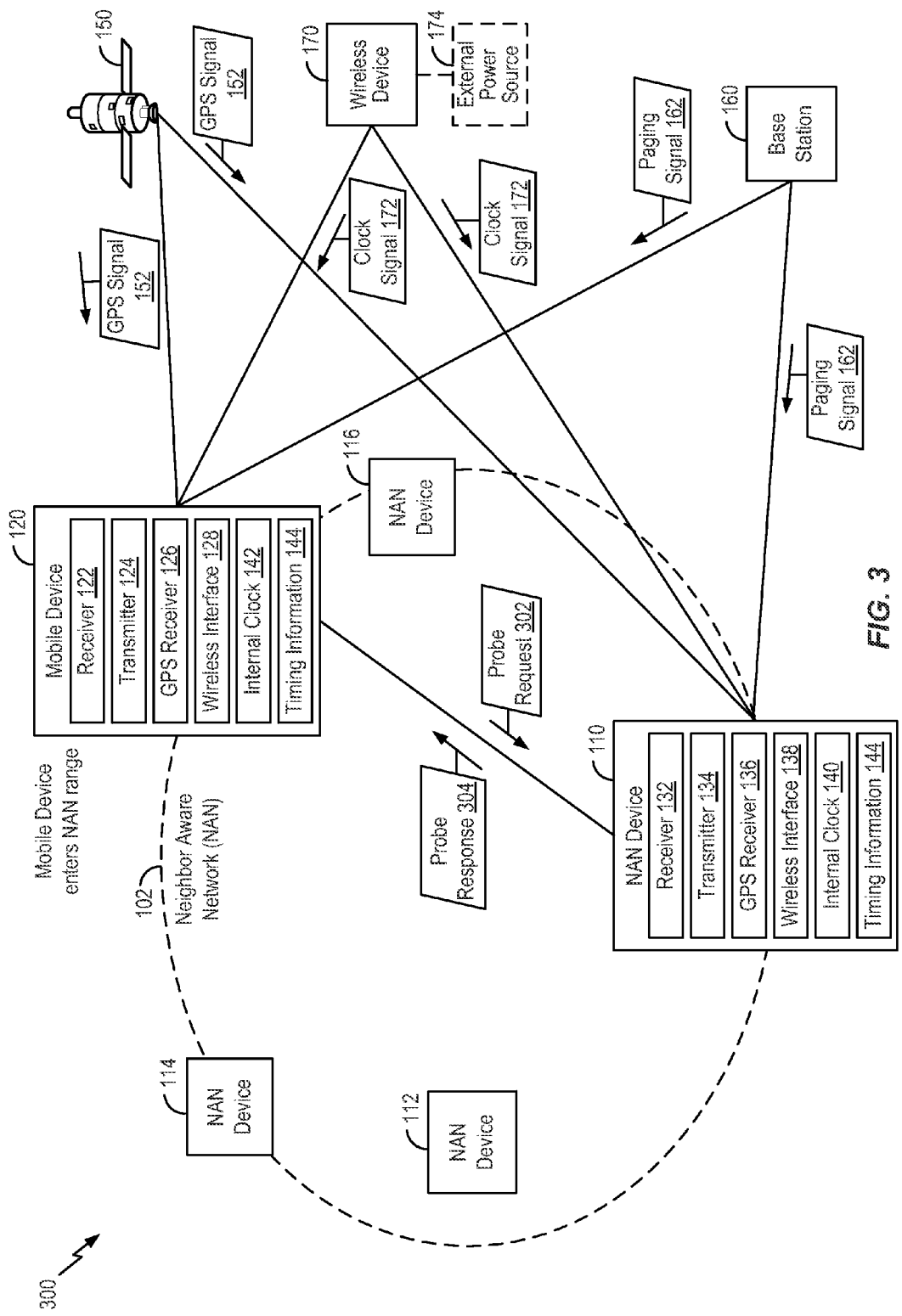
FIG. 3 is a diagram of a particular aspect of a system that includes a NAN that supports transmission of a probe request at a designated probe request transmission time.

Referring to FIG. 3, a particular aspect of a system 300 that supports transmission of a probe request (e.g., probe request 302) in a NAN at a designated probe request transmission time is shown. The system 300 includes the NAN 102, the NAN devices 110-116, the mobile device 120, the GPS satellite 150, the base station 160, and the wireless device 170 of FIG. 1.

During operation, the mobile device 120 may act as a non-master device and may transmit a probe request 302 (e.g., a probe request message or frame) via the NAN 102 at one or more designated probe request transmission times. The designated probe request transmission times may be indicated by the timing information 144 stored at multiple devices (e.g., the first NAN device 110 and the mobile device 120). The mobile device 120 may determine the designated probe request transmission times based on the second internal clock 142 and based on the timing information 144. In a particular implementation, the designated probe request transmission times may be distinct from a transmission time associated with an anchor beacon (e.g., a transmission time that occurs approximately once every 200 ms).

To enable reception of the probe request 302 at the first NAN device 110, the first NAN device 110 may perform a scan of the NAN 102 for one or more probe requests at the designated probe request transmission times. The first NAN device 110 may determine the designated probe request transmission times based on the timing information 144 and based on the first internal clock 140. In a particular implementation, the first NAN device 110 may enter a powered-on mode and activate the receiver 132 of the first NAN device 110 for a duration of a scan window at the designated probe request transmission times to perform the scan. The scan window may begin at the designated probe request transmission times or may begin prior to the designated probe request transmission times. In a particular implementation, the first NAN device 110 may act as a master device and, in response to receiving the probe request 302 from the mobile device 120, transmit a probe response 304 (e.g., a probe response message or frame) to the mobile device 120. The probe response 304 may indicate an upcoming discovery window (e.g., schedule/timing information associated with the upcoming discovery window). The first NAN device 110 may enter a low power (e.g., sleep) mode and deactivate the receiver 132 for a remaining portion of a time interval that does not include the scan windows associated with the designated probe request transmission times to reduce power consumption at the first NAN device 110.

In order to synchronize the second internal clock 142 of the mobile device 120 with the first internal clock 140 of the first NAN device 110, the first NAN device 110 and the mobile device 120 may perform synchronization operations based on the GPS signal 152, the paging signal 162, the clock signal 172, or a combination thereof, as described with reference to FIG. 1. Synchronizing the internal clocks 140 and 142 based on the GPS signal 152, the paging signal 162, the clock signal 172, or a combination thereof, may reduce or eliminate a possibility that the receiver of the first NAN device 110 is deactivated when the mobile device 120 transmits the probe request 302. For example, clock drift associated with the first internal clock 140 or the second internal clock 142 may be compensated for by performing the synchronization operations.

Thus, when active scanning is used in the system 300, a master device of the NAN 102 may activate a receiver at designated probe request transmission times (e.g., for durations of scan windows) instead of for an entirety of a time interval designated by a NAN standard. Because non-master devices schedule transmissions of probe requests at the designated probe request transmission times, the master device may deactivate the receiver (e.g., enter a low power mode) during a remaining portion of the time interval without missing probe requests, thereby conserving power as compared to activating the receiver for the entirety of the time interval. Because the master device and the non-master devices synchronize internal clocks based on at least one clock reference (e.g., a GPS signal, a paging signal from a base station, or a clock signal from a wireless device), a possibility that clock drift will cause the receiver of the master device to be deactivated when the non-master devices transmit probe requests is reduced or eliminated. Additionally, because transmission of the probe requests are scheduled during the designated probe request transmission times (e.g., during a portion of the time interval), probe requests are not transmitted during the remainder of the time interval. Thus, "pollution" in the NAN 102 during the remainder of the time interval is reduced and interference to other wireless transmissions of the NAN 102 caused by probe requests is reduced or eliminated during the remainder of the time interval.

Figure 4:
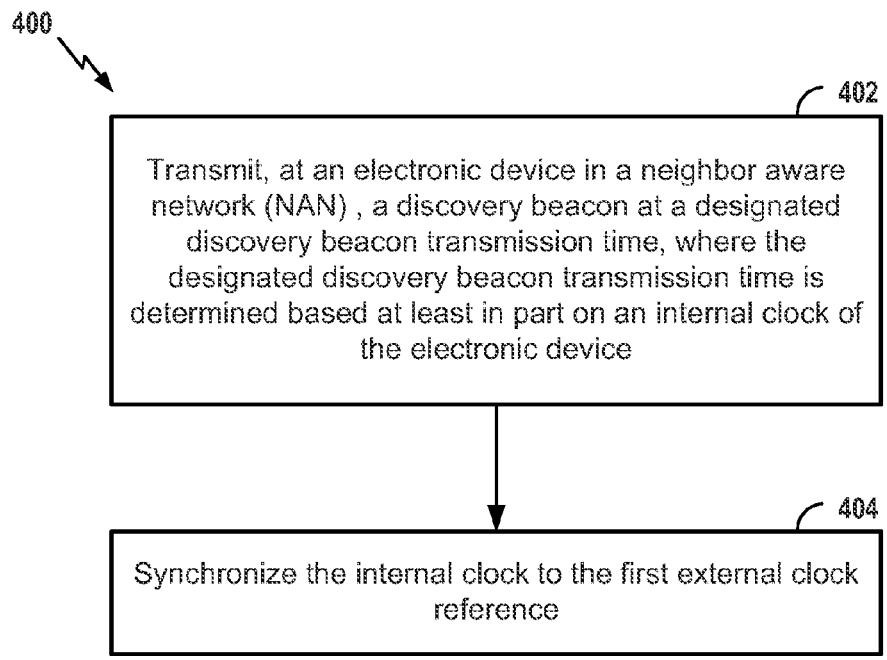
FIG. 4 is a flow diagram of a first illustrative method of operation at a device of a NAN.

Referring to FIG. 4, a first illustrative method of operation at a device of a NAN is shown and designated 400. The method 400 may be performed at an electronic device of a NAN. For example, the method 400 may be performed at the first NAN device 110 of FIG. 1.

The method 400 includes transmitting, at an electronic device in the NAN, a discovery beacon at a designated discovery beacon transmission time, at 402. For example, the first NAN device 110 may transmit the discovery beacon 130 at the designated discovery beacon transmission time. The designated discovery beacon transmission time is determined based at least in part on an internal clock of the electronic device. For example, the designated discovery beacon transmission time may be determined based at least in part on the first internal clock 140 of the first NAN device 110 of FIG. 1. The internal clock may be synchronized to a first clock reference that is external to the electronic device.

In a particular implementation, the electronic device may be a master device of the NAN. Additionally or alternatively, timing information associated with the designated discovery beacon transmission time may be stored at multiple electronic devices in the NAN. For example, the timing information may include or correspond to the timing information 144 stored at the first NAN device 110 of FIG. 1.

The method 400 further includes synchronizing the internal clock based on the first clock reference, at 404. In a particular implementation, the first clock reference may include a GPS signal. For example, the first internal clock 140 may be synchronized (e.g., to other internal clocks of other devices) based on the GPS signal 152 of FIG. 1.

In a particular implementation, the discovery beacon may enable one or more NAN-enabled devices to detect a presence of the NAN. For example, the discovery beacon 130 may enable the mobile device 120 to detect a presence of the NAN 102 in FIG. 1. Additionally or alternatively, the discovery beacon may identify an upcoming discovery window of the NAN. For example, the upcoming discovery window may include or correspond to the discovery window 232 of FIG. 2. The upcoming discovery window may start subsequent to (e.g., after) the designated discovery beacon transmission time. The method 400 may further include performing one or more NAN actions during the upcoming discovery window. The one or more NAN actions may enable one or more NAN-enabled devices to join the NAN. For example, the first NAN device 110 may perform one or more actions to enable the mobile device 120 to join the NAN 102.

In another particular implementation, the designated discovery beacon transmission time may occur at a particular time offset during a time interval. For example, the designated discovery beacon transmission time t2 may occur at a particular time offset during an interval between termination of the discovery window 230 and a start of the discovery window 232. Additionally, the method 400 further includes transmitting the discovery beacon at multiple designated discovery beacon transmission times. For example, discovery beacons may be transmitted at each of the designated discovery beacon transmission times t2-t6. Each of the multiple designated discovery beacon transmission times may occur at a multiple of the particular time offset during the time interval.

In another particular implementation, the method 400 further includes transmitting the discovery beacon multiple times during a time interval. As an example, the time interval may be approximately 300 milliseconds.

In another particular implementation, the method 400 further includes activating a GPS receiver of the electronic device for a particular duration during a second time interval, receiving the GPS signal at the GPS receiver, and synchronizing the internal clock based on the GPS signal. The particular duration may include approximately one second, and the second time interval may include approximately six minutes. For example, the first NAN device 110 may activate the GPS receiver 136, receive the GPS signal 152, and synchronize the first internal clock 140 based on the GPS signal 152.

In another particular implementation, the method 400 further includes performing additional synchronization of the internal clock based on a second clock reference that is external to the electronic device. The second clock reference may include a paging signal received via a paging channel or a broadcast channel associated with communication between the electronic device and a base station. For example, with reference to FIG. 1, the first NAN device 110 may receive the paging signal 162 from the base station 160. In a particular implementation, the base station may be configured to operate in accordance with an LTE wireless standard. The method 400 further includes receiving the paging signal at the electronic device and performing the additional synchronization of the internal clock based on the paging signal. The paging signal may be received at a rate of approximately once per five seconds.

In another particular implementation, the first clock reference may include a clock signal received from an access point (AP) of a wireless network. For example, the first clock reference may include or correspond to the clock signal 172 received from the wireless device 170 of FIG. 1. The method 400 may further include activating a wireless interface at the electronic device, receiving the clock signal from the AP via the wireless interface, and synchronizing the internal clock based on the clock signal. For example, the first NAN device 110 may active the wireless interface 138 to receive the clock signal 172 from the wireless device 170. Alternatively, the first clock reference may include a clock signal received from a wireless device acting as a group owner (GO). For example, the clock signal may include or correspond to the clock signal 172 received via a Wi-Fi Direct transmission from the wireless device 170 of FIG. 1. Alternatively, the first clock reference may include a clock signal received from a station of a wireless network. The station may be coupled to an external power source. For example, the wireless device 170 may be coupled to the external power source 174.

In a particular implementation, the method 400 includes activating a receiver of the electronic device at a second designated discovery beacon transmission time and synchronizing the internal clock to the first clock reference. The receiver may be activated to scan for discovery beacons associated with a second NAN, and the second designated discovery beacon transmission time may be determined based on the internal clock of the electronic device. For example, the mobile device 120 may activate the receiver 122 at a designated discovery beacon transmission time and may synchronize the second internal clock 142, as further described with reference to FIG. 5.

In a particular implementation, the method 400 may include scanning for one or more discovery beacons at a second designated discovery beacon transmission time and during a second scan interval, synchronizing the internal clock to the first clock reference, and transmitting a second discovery beacon in response to determining that no discovery beacons have been received during the second scan interval. For example, the first NAN device 110 may transmit an additional discovery beacon in response to determining that no discovery beacons have been received during a scan interval, as further described with reference to FIG. 8.

The method 400 may enable an electronic device to transmit discovery beacons at designated discovery beacon times based at least in part on an internal clock of the electronic device that is synchronized to a first clock reference.

Figure 5:
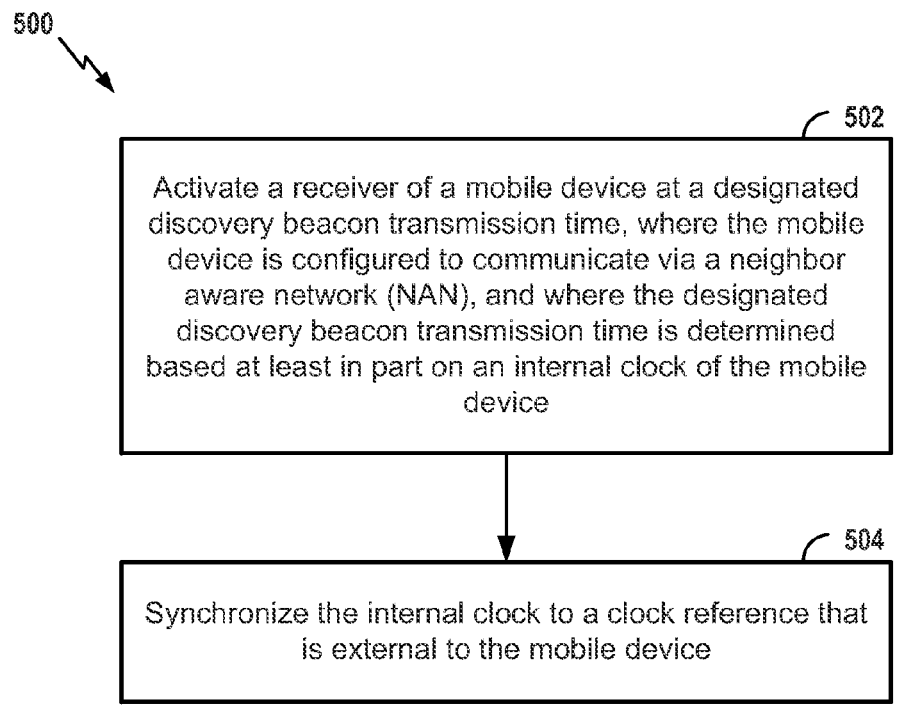
FIG. 5 is a flow diagram of a second illustrative method of operation at a device of a NAN.

Referring to FIG. 5, a second illustrative method of operation at a device of a NAN is shown and designated 500. The method 500 may be performed at the mobile device 120 of FIG. 1. The method 500 may be performed at an electronic device of a NAN. For example, the method 500 may be performed at the mobile device 120 as a method of searching for NANs.

The method 500 includes activating a receiver of a mobile device at a designated discovery beacon transmission time, at 502. For example, the mobile device 120 may activate the receiver 122 at the designated discovery beacon transmission time. The receiver may be activated to scan for discovery beacons associated with a NAN. For example, the receiver 122 may be activated to scan for discovery beacons associated with the NAN 102 of FIG. 1. The designated discovery beacon transmission time may be determined based at least in part on an internal clock of the mobile device. For example, the designated discovery beacon transmission time may be determined based at least in part on the second internal clock 142 of FIG. 1.

The method 500 further includes synchronizing the internal clock to a clock reference that is external to the mobile device, at 504. In a particular implementation, the clock reference may include a GPS signal. For example, the second internal clock 142 may be synchronized to the GPS signal 152 of FIG. 1.

In a particular implementation, the method 500 further includes receiving a discovery beacon during a scan interval (at the designated discovery beacon transmission time). For example, the mobile device 120 may receive the discovery beacon 130 from the first NAN device 110 of FIG. 1. The discovery beacon may identify an upcoming discovery window of the NAN. The upcoming discovery window starts subsequent to (e.g., after) the discovery beacon transmission time. For example, the upcoming discovery window may include or correspond to the discovery window 232 of FIG. 2. In this particular implementation, the method 500 may further include entering a low power (e.g., sleep) mode subsequent to receiving the discovery beacon. The receiver may be deactivated during the low power mode. For example, the mobile device 120 may deactivate the receiver 122 during the low power mode. The method 500 may further include entering a powered-on mode and performing at least one discovery operation during the upcoming discovery window. The receiver may be activated during the powered-on mode. For example, the receiver 122 may be activated prior to a start time of the discovery window or during the discovery window. The at least one discovery operation may include identifying other devices in the NAN, identifying services provided by devices in the NAN, transferring data to other devices in the NAN, and/or scheduling a future data transfer. The at least one discovery operation may enable the mobile device to join the NAN.

In another particular implementation, the method 500 further includes receiving a discovery beacon from an electronic device of the NAN during a duration of a scan window at the designated discovery beacon transmission time. For example, the mobile device 120 may receive the discovery beacon 130 from the first NAN device 110 of FIG. 1 during one or more of the scan windows 240-248 of FIG. 2. The receiver may be activated at the designated discovery beacon transmission time for a duration of a scan window. For example, the scan window may include or correspond to the scan windows 240-248 of FIG. 2, and the receiver 122 may be activated during the scan window. In this implementation, the method 500 further includes receiving a discovery beacon during the duration of the scan window.

Additionally or alternatively, timing information associated with the designated discovery beacon transmission time may be stored at multiple electronic devices of the NAN. For example, the timing information may include or correspond to the timing information 144 of FIG. 1. Additionally or alternatively, multiple receivers of multiple electronic devices of the NAN may be activated at the designated discovery beacon transmission time. Additionally or alternatively, the mobile device may be a non-master device of the NAN.

In another particular implementation, the method 500 further includes deactivating the receiver for a remaining portion of a first time interval. As an example, the first time interval may be approximately 200 milliseconds, and the remaining portion may correspond to times other than the designated discovery beacon transmission times during the first time interval. The method 500 further includes determining whether any discovery beacons have been received during the first time interval and, in response to determining that no discovery beacons have been received during the first time interval, configuring the receiver in a second operating mode. In a first operating mode, the receiver is activated at the designated discovery beacon transmission times and deactivated at other times. In the second operating mode, the receiver is activated for an entirety of a second time interval. In this implementation, the second time interval has a same duration as the first time interval.

In another particular implementation, the method 500 further includes activating the receiver at multiple times during a time interval and deactivating the receiver for a remaining portion of the time interval. The multiple times may be determined based on timing information associated with the designated discovery beacon transmission time. The timing information may be stored at multiple electronic devices of the NAN. For example, the receiver 122 may be activated multiple times during a time interval based on the timing information 144 that is stored at the first NAN device 110 and the mobile device 120 of FIG. 1.

In another particular implementation, the method 500 further includes activating a GPS receiver to acquire a GPS signal. The GPS receiver may be activated at a first frequency and synchronizing the internal clock to the clock reference may include synchronizing the internal clock based on the GPS signal. As an example, the first frequency may be approximately once per six minutes. For example, the GPS receiver 126 may be activated at a first frequency, and the second internal clock 142 may be synchronized based on the GPS signal 152.

In another particular implementation, the method 500 includes activating a GPS receiver to acquire a GPS signal, and performing additional synchronization of the internal clock based on a paging signal received via a paging channel associated with communication between the mobile device and a base station. For example, the additional synchronization may be performed based on the paging signal 162 received from the base station 160 of FIG. 1. Synchronizing the internal clock to the clock reference may include synchronizing the internal clock to the GPS signal. The GPS receiver may be activated at a second frequency and the clock reference may include the GPS signal. As an example, the second frequency may be approximately once per hour. The base station may be configured to operate in accordance with an LTE wireless standard.

The method 500 may enable a mobile device to activate a receiver at designated discovery beacon times based at least in part on an internal clock of the mobile device that is synchronized to a clock reference. The method 500 may also enable the mobile device to conserve power by deactivating the receiver during a remaining portion of a time interval (e.g., times other than the designated discovery beacon transmission times).

Figure 6:
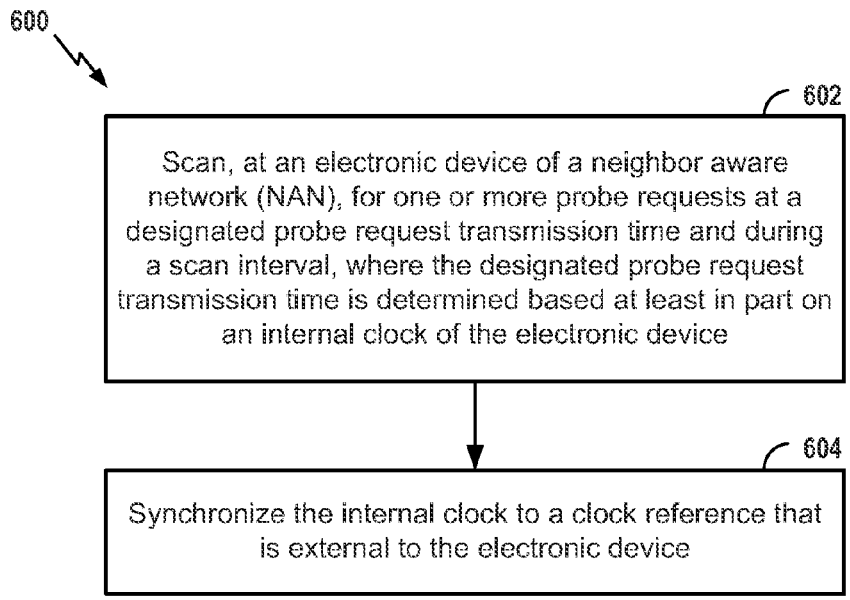
FIG. 6 is a flow diagram of a third illustrative method of operation at a device of a NAN.

Referring to FIG. 6, a third illustrative method of operation at a device of a NAN is shown and designated 600. The method 600 may be performed at an electronic device of a NAN. For example, the method 600 may be performed at the first NAN device 110 of FIG. 3.

The method 600 includes scanning, at an electronic device of a NAN, for one or more probe requests at a designated probe request transmission time and during a scan interval, at 602. For example, the first NAN device 110 may scan the NAN 102 of FIG. 3 for one or more probe requests at the designated probe request transmission time. The scan interval may include or correspond to the scan windows 240-248 of FIG. 2. The designated probe request transmission time may be determined based at least in part on an internal clock of the electronic device. For example, the designated probe request transmission time may be determined based at least in part on the first internal clock 140 of FIG. 3.

The method 600 further includes synchronizing the internal clock to a first clock reference that is external to the electronic device, at 604. In a particular implementation, the clock reference may include a GPS signal, a paging signal received from a base station, or a clock signal received from a wireless device. For example, the first internal clock 140 may be synchronized based on the GPS signal 152, the paging signal 162, or the clock signal 172 of FIG. 1.

In a particular implementation, the method 600 further includes activating a receiver for the scan interval to scan for the one or more probe requests and deactivating the receiver during a remaining portion of a time interval that includes the scan interval. For example, during a time interval after termination of the discovery window 230 and prior to the discovery window 232, the receiver 132 of the first NAN device 110 may be deactivated at times other than the scan interval. In another particular implementation, the method 600 further includes scanning for the one or more probe requests at multiple times during a time interval that corresponds to scanning for discovery beacons of the NAN. The multiple times may be determined based on timing information stored at multiple electronic devices. For example, the first NAN device 110 may scan for one or more probe requests at multiple times determined based on the timing information 144 that is stored at the first NAN device 110 and the mobile device 120 of FIG. 3.

In another particular implementation, the method 600 further includes receiving a probe request from a mobile device of the NAN during the scan interval and transmitting a probe response to the mobile device. For example, the first NAN device 110 may receive the probe request 302 from the mobile device 120 and transmit the probe response 304 to the mobile device 120 of FIG. 3. The probe response may indicate an upcoming discovery window of the NAN. The upcoming discovery window may start subsequent to the designated probe request transmission time. The probe response may enable the mobile device to join the NAN during an upcoming discovery window. For example, the probe response 304 may enable the mobile device 120 to join the NAN 102 of FIG. 3 during the discovery window 232 of FIG. 2. In another particular implementation, the electronic device may be a master device. Additionally or alternatively, the designated probe request transmission time may be distinct from a transmission time associated with an anchor beacon. For example, the designated probe request transmission time may be distinct from a transmission time of the anchor beacons 210 and 212 of FIG. 2.

The method 600 may enable the electronic device to receive probe requests at designated probe request times based at least in part on an internal clock of the electronic device that is synchronized to a clock reference.

Figure 7:
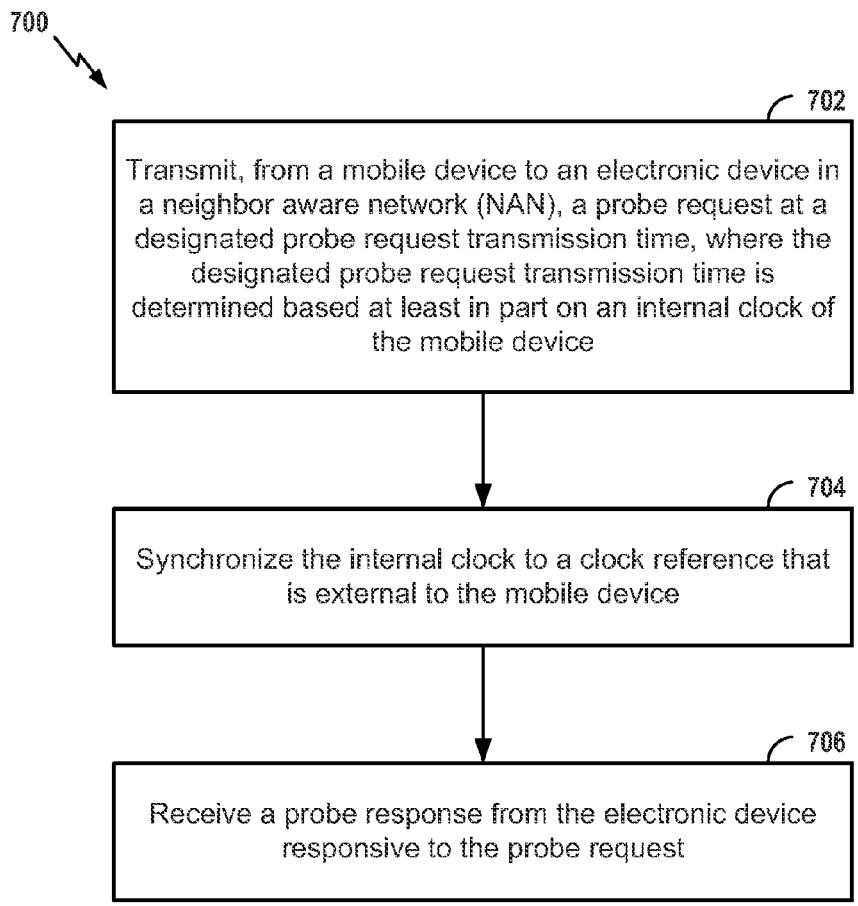
FIG. 7 is a flow diagram of a fourth illustrative method of operation at a device of a NAN.

Referring to FIG. 7, a fourth illustrative method of operation at a device of a NAN is shown and designated 700. The method 700 may be performed at the mobile device 120 of FIG. 3. In a particular implementation, the method 700 may be performed at the mobile device 120 as a method of searching for NANs.

The method 700 includes transmitting, from a mobile device to an electronic device in a NAN, a probe request at a designated probe request transmission time, at 702. For example, the mobile device 120 may transmit the probe request 302 to the first NAN device 110 of FIG. 3 at the designated probe request transmission time. The designated probe request transmission time may be determined based at least in part on an internal clock of the mobile device. For example, the designated probe request transmission time may be determined based at least in part on the second internal clock 142 of FIG. 3.

The method 700 includes synchronizing the internal clock to a clock reference that is external to the electronic device, at 704. In a particular implementation, the clock reference may include a GPS signal. For example, the second internal clock 142 may be synchronized to the GPS signal 152 of FIG. 3.

The method 700 further includes receiving a probe response from the electronic device responsive to the probe request, at 706. For example, the mobile device 120 may receive the probe response 304 from the first NAN device 110 responsive to the probe request 302 of FIG. 3.

In a particular implementation, the probe response may identify an upcoming discovery window of the NAN. The upcoming discovery window starts subsequent to (e.g., after) the designated probe request transmission time. For example, the probe response 304 of FIG. 3 may identify the discovery window 232 of FIG. 2. Additionally, a transmitter of the mobile device may be activated at the designated probe request transmission time to transmit the probe request. For example, the transmitter 124 of the mobile device 120 may be activated at the designated probe request transmission time to transmit the probe request 302. In this particular implementation, the method 700 may further include entering a low power (e.g., sleep) mode subsequent to receiving the probe response. The receiver may be deactivated during the low power mode. For example, the receiver 122 may be deactivated when the mobile device 120 operates in the low power mode. The method 700 may further include entering a powered-on mode and performing at least one discovery operation during the upcoming discovery window. The receiver may be activated during the powered-on mode. For example, the receiver 122 of the mobile device 120 may be activated prior to a start time of the discovery window or during the discovery window. The at least one discovery operation may enable the mobile device to join the NAN. For example, the at least one discovery operation may include identifying other devices in the NAN, identifying services provided by devices in the NAN, transferring data to other devices in the NAN, and/or scheduling a future data transfer.

The method 700 may enable the mobile device to transmit probe requests at designated probe request times based at least in part on an internal clock of the mobile device that is synchronized to a clock reference. The method 700 may also enable the mobile device to conserve power by deactivating the receiver during a remaining portion of a time interval (e.g., times other than the designated probe request transmission times).

Figure 8:
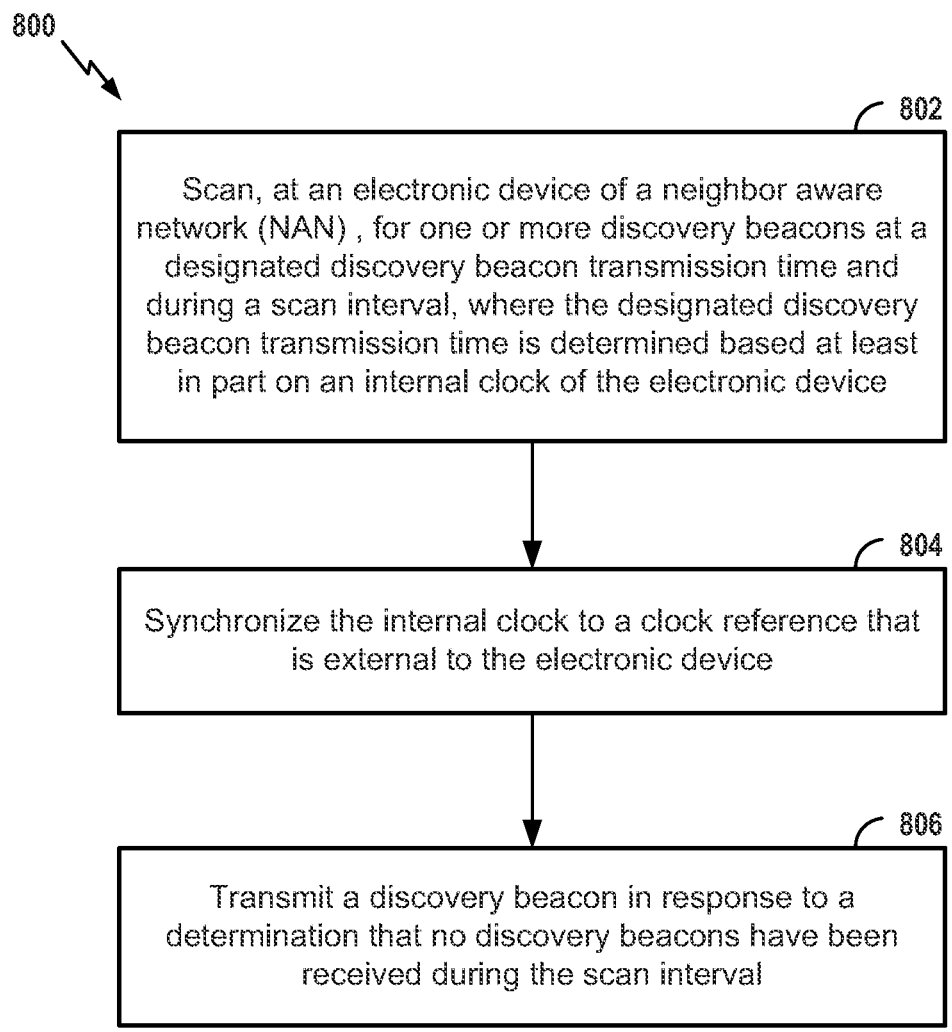
FIG. 8 is a flow diagram of a fifth illustrative method of operation at a device of a NAN.

Referring to FIG. 8, a fifth illustrative method of operation at a device of a NAN is shown and designated 800. The method 800 may be performed at the first NAN device 110 of FIG. 1.

The method 800 includes scanning, at an electronic device of a NAN, for one or more discovery beacons at a designated discovery beacon transmission time and during a scan interval, at 802. For example, the first NAN device 110 may scan the NAN 102 for one or more discovery beacons at the designated discovery beacon transmission time. The scan interval may include or correspond to the scan windows 240-248 of FIG. 2. The designated discovery beacon transmission time may be determined based at least in part on an internal clock of the electronic device. For example, the designated discovery beacon transmission time may be determined based at least in part on the first internal clock 140 of FIG. 1.

The method 800 includes synchronizing the internal clock to a clock reference that is external to the electronic device, at 804. In a particular implementation, the clock reference may include a GPS signal. For example, the first internal clock 140 may be synchronized to the GPS signal 152 of FIG. 1.

The method 800 further includes transmitting a discovery beacon in response to determining that no discovery beacons have been received during the scan interval, at 806. For example, the first NAN device 110 may transmit the discovery beacon 130 in response to determining that no discovery beacons have been received during the scan interval (e.g., one or more of the scan windows 240-248).

In a particular implementation, the method 800 further includes activating a receiver during the scan interval to scan for the one or more discovery beacons and deactivating the receiver during a remaining portion of a time interval (e.g., at times other than the scan interval). Additionally or alternatively, timing information associated with the designated discovery beacon transmission time may be stored at multiple electronic devices in the NAN. For example, the timing information may include or correspond to the timing information 144 stored at the first NAN device 110 and the mobile device 120 of FIG. 1. The electronic device may be a non-master device of the NAN. The discovery beacon may enable a NAN-enabled device to join the NAN during an upcoming discovery window identified by the discovery beacon. For example, the discovery beacon 130 may enable the mobile device 120 to join the NAN 102 of FIG. 1 during the discovery window 232 of FIG. 2.

In another particular implementation, the method 800 further includes synchronizing the internal clock based on a GPS signal and performing additional synchronization of the internal clock based on a paging signal received via a paging channel associated with communication between the electronic device and a base station. For example, the GPS signal may include or correspond to the GPS signal 152 and the paging signal may include or correspond to the paging signal 162 received from the base station 160 in FIG. 1.

The method 800 may enable the electronic device to transmit a discovery beacon at a designated discovery beacon time in NANs where a master device does not transmit a discovery beacon at the designated discovery beacon transmission time.

Figure 9:
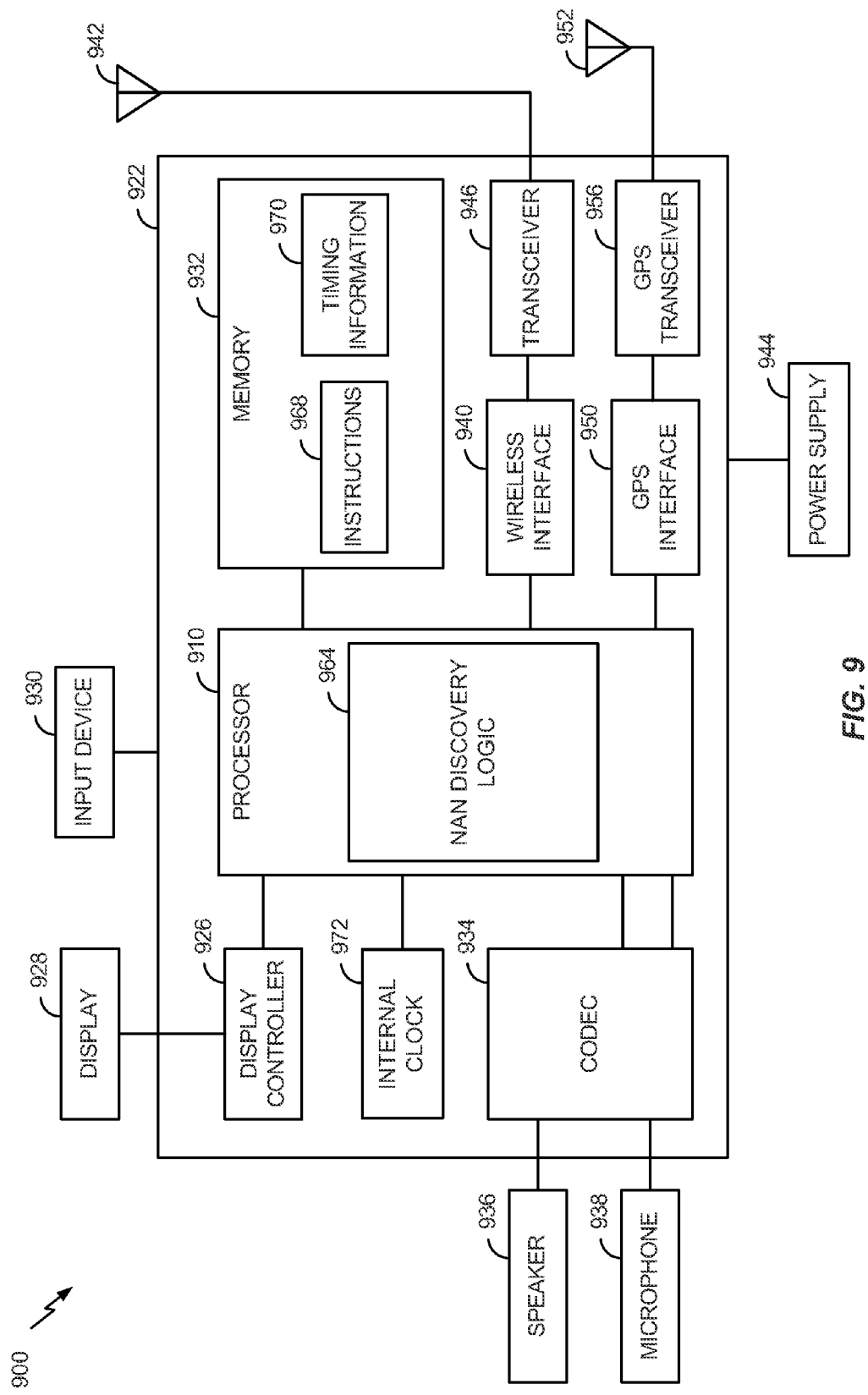
FIG. 9 is a diagram of a wireless device that is operable to support various aspects of one or more methods, systems, apparatuses, and/or computer-readable media disclosed herein.

Referring to FIG. 9, a particular illustrative implementation of a wireless communication device is depicted and generally designated 900. The device 900 includes a processor 910, such as a digital signal processor, coupled to a memory 932. In an illustrative implementation, the device 900, or components thereof, may correspond to the NAN devices 110-116 of FIG. 1 or 3 and/or the mobile device 120 of FIG. 1 or 3, or components thereof.

The processor 910 (e.g., a digital signal processor (DSP), a central processing unit (CPU) a network processing unit (NPU), etc.) may be configured to execute software (e.g., a program of one or more instructions 968) stored in the memory 932. In a particular implementation, the processor 910 is configured to operate in accordance with one or more of the methods of FIGS. 4-8. For example, the processor 910 may include NAN discovery logic 964 to execute one or more of the methods of FIGS. 4-8. In an illustrative implementation, the processor 910 may determine designated discovery beacon transmission times or designated probe request transmission times based at least in part on an internal clock 972 and timing information 970 stored in the memory 932. For example, the internal clock 972 may include or correspond to the internal clocks 140 and 142 of FIGS. 1 and 3, the timing information 970 may include or correspond to the timing information 144 of FIGS. 1 and 3, and the designated discovery beacon transmission times or designated probe request transmission times may be determined as described with reference to FIGS. 1 and 3. The processor 910 may synchronize the internal clock 972 to a clock reference received via a GPS antenna 952. In an illustrative implementation, the processor 910 may synchronize the internal clock 972 based on the GPS signal 152 of FIGS. 1 and 3 received via the GPS antenna 952.

A wireless interface 940 (e.g., an IEEE 802.11a, 802.11b, 802.11g, 802.11n, 802.11ac, 802.11ad, etc. wireless interface) may be coupled to the processor 910 and to an antenna 942. For example, the wireless interface 940 may be coupled to the antenna 942 via a transceiver 946, such that wireless data may be received via the antenna 942 and may be provided to the processor 910. The wireless interface 940 may include or correspond to the wireless interfaces 128, 138 of FIGS. 1 and 3, and the transceiver 946 may perform the operations of the receivers 122, 132 and the transmitters 124, 134, of FIGS. 1 and 3. A GPS interface 950 may be coupled to the processor 910 and to the GPS antenna 952. For example, the GPS interface 950 may be coupled to the GPS antenna 952 via a GPS transceiver 956, such that GPS data and/or signals received via the GPS antenna 952 may be provided to the processor 910. The GPS antenna 952 may include or correspond to the GPS receivers 126, 136 of FIGS. 1 and 3.

A coder/decoder (CODEC) 934 can also be coupled to the processor 910. A speaker 936 and a microphone 938 can be coupled to the CODEC 934. A display controller 926 can be coupled to the processor 910 and to a display device 928. In a particular implementation, the processor 910, the display controller 926, the memory 932, the CODEC 934, the wireless interface 940, the transceiver 946, the internal clock 972, the GPS transceiver 956, and the GPS interface 950 are included in a system-in-package or system-on-chip device 922. In a particular implementation, an input device 930 and a power supply 944 are coupled to the system-on-chip device 922. Moreover, in a particular implementation, as illustrated in FIG. 9, the display device 928, the input device 930, the speaker 936, the microphone 938, the antenna 942, the GPS antenna 952, and the power supply 944 are external to the system-on-chip device 922. However, each of the display device 928, the input device 930, the speaker 936, the microphone 938, the antenna 942, the GPS antenna 952, and the power supply 944 can be coupled to one or more components of the system-on-chip device 922, such as one or more interfaces or controllers.

In conjunction with the described implementations, a first apparatus includes means for initiating transmission, at an electronic device in a NAN, of a discovery beacon at a designated discovery beacon transmission time. For example, the means for initiating may include the transmitter 134, the first NAN device 110 of FIG. 1, the wireless interface 940, the processor 910 programmed to execute the instructions 968, the NAN discovery logic 964 of FIG. 9, one or more other devices, circuits, modules, or instructions to initiate transmission of a discovery beacon at a designated discovery beacon transmission time, or any combination thereof. The designated discovery beacon transmission time may be determined based at least in part on an internal clock of the electronic device. For example, the internal clock may include or correspond to the first internal clock 140 of FIG. 1 or the internal clock 972 of FIG. 9.

The first apparatus also includes means for synchronizing the internal clock to a clock reference that is external to the electronic device. For example, the means for synchronizing may include the GPS receiver 136, the wireless interface 138, the first NAN device 110 of FIG. 1, the GPS interface 950, the GPS transceiver 956, the processor 910 programmed to execute the instructions 968, the NAN discovery logic 964 of FIG. 9, one or more other devices, circuits, modules, or instructions to synchronize an internal clock to a clock reference that is external to an electronic device, or any combination thereof. In this example, the clock reference may include or correspond to the GPS signal 152 of FIG. 1.

In conjunction with the described implementations, a second apparatus includes means for activating a receiver of a mobile device at a designated discovery beacon transmission time. For example, the means for activating may include the wireless interface 940, the processor 910 programmed to execute the instructions 968, the NAN discovery logic 964 of FIG. 9, one or more other devices, circuits, modules, or instructions to activate a receiver of a mobile device at a designated discovery beacon transmission time, or any combination thereof. The receiver may be activated to scan for discovery beacons associated with a NAN. For example, the receiver 122 may be activated to scan for discovery beacons associated with the NAN 102 of FIG. 1. The designated discovery beacon transmission time may be determined based at least in part on an internal clock of the mobile device. For example, the internal clock may include or correspond to the second internal clock 142 of FIG. 1 or the internal clock 972 of FIG. 9.

The second apparatus also includes means for synchronizing the internal clock to a clock reference that is external to the mobile device. For example, the means for synchronizing may include the GPS receiver 126, the wireless interface 128, the mobile device 120 of FIG. 1, the GPS interface 950, the GPS transceiver 956, the processor 910 programmed to execute the instructions 968, the NAN discovery logic 964 of FIG. 9, one or more other devices, circuits, modules, or instructions to synchronize an internal clock to a clock reference that is external to a mobile device, or any combination thereof. In this example, the clock reference may include or correspond to the GPS signal 152 of FIG. 1.

In conjunction with the described implementations, a third apparatus includes means for initiating a scan, at an electronic device of a NAN, for one or more probe requests at a designated probe request transmission time and during a scan interval. For example, the means for initiating may include the receiver 132, the first NAN device 110 of FIG. 3, the wireless interface 940, the processor 910 programmed to execute the instructions 968, the NAN discovery logic 964 of FIG. 9, one or more other devices, circuits, modules, or instructions to initiate a scan for one or more probe requests at a designated probe request transmission time and during a scan interval, or any combination thereof. The designated probe request transmission time may be determined based at least in part on an internal clock of the electronic device. For example, the internal clock may include or correspond to the first internal clock 140 of FIG. 3 or the internal clock 972 of FIG. 9. The scan interval may include or correspond to one or more of the scan windows 240-248 of FIG. 2.

The third apparatus also includes means for synchronizing the internal clock to a clock reference that is external to the electronic device. For example, the means for synchronizing may include the GPS receiver 136, the wireless interface 138, the first NAN device 110 of FIG. 3, the GPS interface 950, the GPS transceiver 956, the processor 910 programmed to execute the instructions 968, the NAN discovery logic 964 of FIG. 9, one or more other devices, circuits, modules, or instructions to synchronize an internal clock to a clock reference that is external to an electronic device, or any combination thereof. In this example, the clock reference may include or correspond to the GPS signal 152 of FIG. 3.

In conjunction with the described implementations, a fourth apparatus includes means for initiating transmission, from a mobile device to an electronic device in a NAN, of a probe request at a designated probe request transmission time. For example, the means for initiating transmission may include the transmitter 124, the mobile device 120 of FIG. 3, the wireless interface 940, the processor 910 programmed to execute the instructions 968, the NAN discovery logic 964 of FIG. 9, one or more other devices, circuits, modules, or instructions to initiate transmission of a probe request at a designated probe request transmission time, or any combination thereof. The designated probe request transmission time may be determined based at least in part on an internal clock of the mobile device. For example, the internal clock may include or correspond to the second internal clock 142 of FIG. 3 or the internal clock 972 of FIG. 9.

The fourth apparatus also includes means for synchronizing the internal clock to a clock reference that is external to the mobile device. For example, the means for synchronizing may include the GPS receiver 126, the wireless interface 128, the mobile device 120 of FIG. 3, the GPS interface 950, the GPS transceiver 956, the processor 910 programmed to execute the instructions 968, the NAN discovery logic 964 of FIG. 9, one or more other devices, circuits, modules, or instructions to synchronize an internal clock to a clock reference that is external to a mobile device, or any combination thereof. In this example, the clock reference may include or correspond to the GPS signal 152 of FIG. 3.

The fourth apparatus also includes means for initiating reception of a probe response from the electronic device responsive to the probe request. For example, the means for initiating reception may include the mobile device 120 of FIG. 3, the wireless interface 940, the processor 910 programmed to execute the instructions 968, the NAN discovery logic 964 of FIG. 9, one or more other devices, circuits, modules, or instructions to initiate reception of a probe response from an electronic device responsive to a probe request, or any combination thereof.

In conjunction with the described implementations, a fifth apparatus includes means for initiating a scan, at an electronic device of a NAN, for one or more discovery beacons at a designated discovery beacon transmission time and during a scan interval. For example, the means for initiating a scan may include the receiver 132, the first NAN device 110 of FIG. 1, the wireless interface 940, the processor 910 programmed to execute the instructions 968, the NAN discovery logic 964 of FIG. 9, one or more other devices, circuits, modules, or instructions to initiate transmission of a scan for one or more discovery beacons at a designated discovery beacon transmission time and during a scan interval, or any combination thereof. The designated discovery beacon transmission time may be determined based at least in part on an internal clock of the electronic device. For example, the internal clock may include or correspond to the first internal clock 140 of FIG. 1 or the internal clock 972 of FIG. 9. The scan interval may include or correspond to one or more of the scan windows 240-248 of FIG. 2.

The fifth apparatus also includes means for synchronizing the internal clock to a clock reference that is external to the electronic device. For example, the means for synchronizing may include the GPS receiver 136, the wireless interface 138, the first NAN device 110 of FIG. 1, the GPS interface 950, the GPS transceiver 956, the processor 910 programmed to execute the instructions 968, the NAN discovery logic 964 of FIG. 9, one or more other devices, circuits, modules, or instructions to synchronize an internal clock to a clock reference that is external to an electronic device, or any combination thereof. In this example, the clock reference may include or correspond to the GPS signal 152 of FIG. 1.

The fifth apparatus also includes means for initiating transmission of a discovery beacon in response to determining that no discovery beacons have been received during the scan interval. For example, the means for initiating transmission may include the transmitter 134, the first NAN device 110 of FIG. 1, the wireless interface 940, the processor 910 programmed to execute the instructions 968, the NAN discovery logic 964 of FIG. 9, one or more other devices, circuits, modules, or instructions to initiate transmission of a discovery beacon in response to determining that no discovery beacons have been received during the scan interval, or any combination thereof.

Those of skill in the art would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A method of wireless communication, the method comprising:
   transmitting, at an electronic device in a neighbor aware network (NAN), a discovery beacon at a designated discovery beacon transmission time, the discovery beacon enabling one or more NAN-enabled devices to detect a presence of the NAN and to identify an upcoming discovery window of the NAN, wherein the designated discovery beacon transmission time is determined based at least in part on an internal clock of the electronic device, and wherein the upcoming discovery window starts subsequent to the designated discovery beacon transmission time; and
   synchronizing the internal clock to a first clock reference signal having a source that is external to the electronic device.

2. The method of claim 1, further comprising performing one or more NAN actions during the upcoming discovery window, wherein the one or more NAN actions enable one or more NAN-enabled devices to join the NAN.

3. The method of claim 1, wherein timing information associated with the designated discovery beacon transmission time is stored at multiple electronic devices in the NAN.

4. The method of claim 1, further comprising transmitting the discovery beacon multiple times during a time interval, wherein the designated discovery beacon transmission time occurs at a particular time offset during the time interval.

5. The method of claim 1, further comprising:
   activating a global positioning satellite (GPS) receiver of the electronic device for a particular duration during a second time interval, wherein the first clock reference signal comprises a GPS signal;
   receiving the GPS signal at the GPS receiver; and
   synchronizing the internal clock based on the GPS signal.

6. The method of claim 1, wherein synchronizing the internal clock comprises:
   performing a first synchronization operation based on the first clock reference signal; and
   performing a second synchronization operation based on a second clock reference signal having a second source that is external to the electronic device, wherein the second clock reference signal is different than the first clock reference signal.

7. The method of claim 1, further comprising subsequent to synchronizing the internal clock to the first clock reference signal, activating a receiver of the electronic device at a second designated discovery beacon transmission time, wherein the receiver is activated to scan for discovery beacons associated with a second NAN, and wherein the second designated discovery beacon transmission time is determined based at least in part on the internal clock of the electronic device.

8. The method of claim 7, further comprising receiving a second discovery beacon during a scan interval at the second designated discovery beacon transmission time, wherein the second discovery beacon identifies an upcoming discovery window of the second NAN, and wherein the upcoming discovery window of the second NAN starts subsequent to the second designated discovery beacon transmission time.

9. The method of claim 8, further comprising:
entering a low power mode subsequent to receiving the second discovery beacon, wherein the receiver is deactivated during the low power mode;
entering a powered-on mode, wherein the receiver is activated during the powered-on mode; and
performing at least one discovery operation during the upcoming discovery window of the second NAN.

10. The method of claim 7, wherein the receiver is activated at the designated discovery beacon transmission time for a duration of a scan window.

11. The method of claim 7, further comprising deactivating the receiver for a remaining portion of a second time interval that corresponds to scanning for discovery beacons of the second NAN.

12. The method of claim 11, further comprising:
determining whether any discovery beacons have been received during the second time interval, wherein the receiver is configured in a first operating mode such that the receiver is activated at the second designated discovery beacon transmission time and deactivated during the remaining portion of the second time interval; and
in response to determining that no discovery beacons have been received during the second time interval, configuring the receiver in a second operating mode, wherein the receiver is activated for an entirety of a third time interval when configured in the second operating mode, the third time interval having a same duration as the second time interval.

13. The method of claim 7, further comprising:
activating the receiver at multiple times during a second time interval, wherein the multiple times are determined based on timing information; and
deactivating the receiver for a remaining portion of the second time interval.

14. The method of claim 1, further comprising:
scanning, at the electronic device, for one or more discovery beacons at a second designated discovery beacon transmission time and during a second scan interval, wherein the second designated discovery beacon transmission time is determined based at least in part on the internal clock;
synchronizing the internal clock to the first clock reference signal; and
transmitting a second discovery beacon in response to determining that no discovery beacons have been received during the second scan interval.

15. The method of claim 1, wherein the first clock reference signal includes a paging signal received at the electronic device from a base station.

16. The method of claim 1, wherein the first clock reference signal includes a clock signal received at the electronic device from a second electronic device, and wherein the second electronic device is coupled to an external power supply.

17. The method of claim 1, further comprising, after synchronizing the internal clock to the first clock reference signal, synchronizing the internal clock to a second clock reference signal that is external to the electronic device, wherein synchronizing the internal clock to the first clock reference signal comprises performing coarse tuning on the internal clock, and wherein synchronizing the internal clock to the second clock reference signal comprises performing fine tuning on the internal clock.

18. An apparatus comprising:
a processor; and
a memory coupled to the processor, wherein the memory stores instructions that are executable by the processor to perform operations comprising:
initiating a scan, at an electronic device of a neighbor aware network (NAN), for one or more probe requests at a designated probe request transmission time and during a scan interval, wherein the designated probe request transmission time is determined based at least in part on an internal clock of the electronic device;
transmitting, at the electronic device, a probe response during the scan interval, wherein the probe response identifies an upcoming discovery window of the NAN, and wherein the upcoming discovery window starts subsequent to the designated probe request transmission time; and
synchronizing the internal clock to a clock reference signal having a source that is external to the electronic device.

19. The apparatus of claim 18, wherein the operations further comprise:
receiving a probe request from a second electronic device of the NAN during the scan interval, wherein the probe response is transmitted in response to receipt of the probe request; and
deactivating a receiver during a second portion of a time interval, wherein the time interval includes the scan interval and the second portion.

20. The apparatus of claim 18, wherein the clock reference signal comprises a paging signal received from a base station.

21. The apparatus of claim 18, wherein the operations further comprise:
transmitting, from the electronic device to a second electronic device in a second NAN, a second probe request at a second designated probe request transmission time, wherein the second designated probe request transmission time is determined based at least in part on the internal clock; and
receiving a second probe response from the second electronic device responsive to transmitting the second probe request.

22. The apparatus of claim 21, wherein the second probe response identifies an upcoming discovery window of the second NAN, wherein the upcoming discovery window of the second NAN starts subsequent to the second designated probe request transmission time, and wherein a transmitter of the electronic device is activated at the second designated probe request transmission time to transmit the second probe request.

23. The apparatus of claim 22, wherein the operations further comprise:
entering a low power mode subsequent to receiving the probe response, wherein the receiver is deactivated during the low power mode; and entering a powered-on mode during the upcoming discovery window to perform at least one discovery operation.

24. An apparatus comprising:
means for transmitting, from an electronic device in a neighbor aware network (NAN), a discovery beacon at a designated discovery beacon transmission time, the discovery beacon enabling one or more NAN-enabled devices to detect a presence of the NAN and to identify an upcoming discovery window of the NAN, wherein the designated discovery beacon transmission time is determined based at least in part on an internal clock of the electronic device, and wherein the upcoming discovery window starts subsequent to the designated discovery beacon transmission time; and
means for synchronizing the internal clock to a clock reference signal having a source that is external to the electronic device.

25. The apparatus of claim 24, wherein the clock reference signal comprises a clock signal received from an access point (AP) of a wireless network.

26. The apparatus of claim 24, wherein the clock reference signal comprises a clock signal received from a wireless device configured to act as a group owner (GO).

27. The apparatus of claim 24, wherein the clock reference signal comprises a clock signal received from a station of a wireless network, and wherein the station is coupled to an external power source.

28. A non-transitory computer readable medium comprising instructions that, when executed by a processor, cause the processor to:
initiate a scan, at an electronic device of a neighbor aware network (NAN), for one or more probe requests at a designated probe request transmission time and during a scan interval, wherein the designated probe request transmission time is determined based at least in part on an internal clock of the electronic device;
transmit, at the electronic device, a probe response during the scan interval, wherein the probe response identifies an upcoming discovery window of the NAN, and wherein the upcoming discovery window starts subsequent to the designated probe request transmission time; and
synchronize the internal clock to a clock reference signal having a source that is external to the electronic device.

29. The non-transitory computer readable medium of claim 28, wherein the instructions, when executed by the processor, cause the processor to perform the scan for the one or more probe requests at multiple times during a time interval, and wherein the multiple times are determined based on timing information stored at multiple electronic devices of the NAN.

30. The non-transitory computer readable medium of claim 28, wherein the designated probe request transmission time is distinct from a transmission time associated with an anchor beacon.

* * * * *